United States Patent [19]

Carts, Jr.

[11] 4,070,763
[45] Jan. 31, 1978

[54] AIMING/SIGHTING DEVICE

[75] Inventor: Stanley L. Carts, Jr., Alexandria, Va.

[73] Assignee: The United States of America as represented by the Secretary of the Army, Washington, D.C.

[21] Appl. No.: 747,132

[22] Filed: Dec. 3, 1976

[51] Int. Cl.² .................... F41G 1/32; F41G 1/02
[52] U.S. Cl. ................................ 33/241; 33/243; 362/32; 362/110; 250/467; 350/96 B
[58] Field of Search .................... 33/241, 242, 243; 240/1 LP, 2 F, 6.41; 250/462, 467; 350/96 B

[56] References Cited
U.S. PATENT DOCUMENTS 1,433,422  10/1922  Spencer ................................ 33/241
3,098,303  7/1963   Plisk .................................... 33/241
3,362,074  1/1968   Luebkeman et al. ................. 33/243
3,463,595  8/1969   Blanc et al. ....................... 350/96 B
3,578,973  5/1971   Dooley et al. ...................... 250/467
3,678,590  7/1972   Hayward ............................. 33/241
3,784,817  1/1974   James et al. ....................... 250/467

Primary Examiner—Richard E. Aegerter
Assistant Examiner—Richard R. Stearns
Attorney, Agent, or Firm—Nathan Edelberg; John E. Holford; Robert P. Gibson

[57] ABSTRACT

An aiming device is provided which combines the directional properties of hollow micro-channel or similar fibers and the light radiation properties of Day-Glo plastics and phosphorescent paints.

7 Claims, 5 Drawing Figures

AIMING/SIGHTING DEVICE

The invention described herein may be manufactured, used, and licensed by the U.S. Government for governmental purposes without the payment of any royalties thereon.

BACKGROUND OF THE INVENTION

The usual sight for military and similar rifles consists of a small solid cylinder mounted above the barrel near its tip and a small metal block with a vee-shaped notch also mounted above the barrel near its rear end. The axis of the cylinder is parallel to the barrel and appears to just touch the sides of the vee-notch when the users line of sight is boresighted with the weapon. The metal block or rear sight is adjusted vertically to compensate for range variations and horizontal for wind effects.

This system has a number of drawbacks. First, the positions of the front and rear sights make it impossible for the user to focus on both sights and the target at the same time. Telescopic sights are available which solve the focussing problem, but these are expensive and limit the user in quickly locating targets of opportunity due to their narrow field of view. The problem becomes even more complicated when the user attempts to use these systems while wearing a pair of night vision goggles or binoculars, which impose additional focusing problems.

BRIEF DESCRIPTION OF THE INVENTION

One object of the invention is, therefore, to provide a single element sight or aiming device for rifles, cameras, surveying instruments and the like, which is very accurate, simple to use, highly reliable and yet very inexpensive.

A further object is to provide an aiming device as indicated above using readily available hollow microchannel fiber members and Day-Glo plastics.

A still further object is to provide an aiming device as described above which can be used under low light level conditions and, at night, with or without image intensifier equipment.

BRIEF DESCRIPTION OF THE DRAWINGS

The invention is best understood with reference to the attached drawings wherein.

Figure 1:
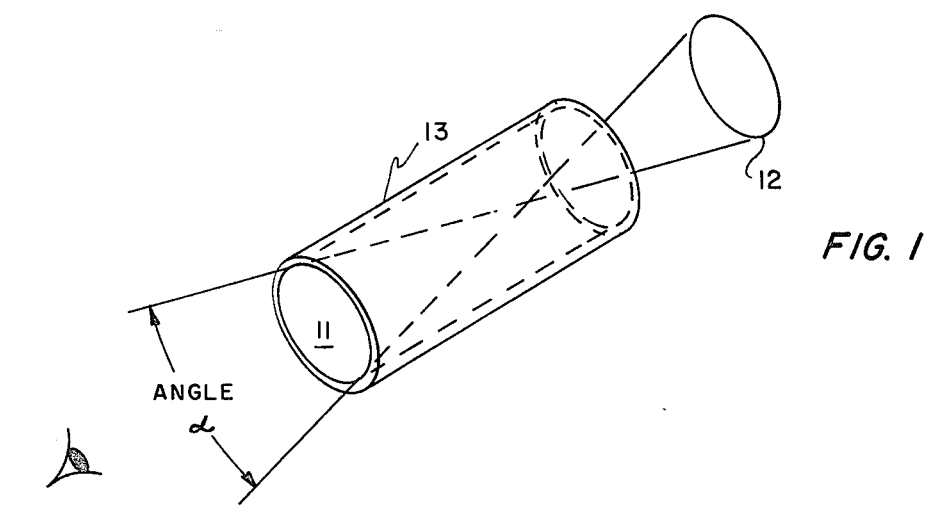
FIG. 1 shows a ray diagram associated with a single hollow micro-channel fiber.

Referring specifically to FIG. 1 there is shown a very short highly enlarged section of a light collimating fiber 11, which can be a coated transparent solid, but is preferably just the coating 13. When a source of illumination 12 is viewed through the fiber the total radiation is collimated or restricted to a small angle $\alpha$. The fiber, if hollow, is light absorbing or consists of a solid transparent core coated with a light absorbing material 13. The core may consist of glass or plastic and the coating or hollow fiber of black glass or plastic, for example. For the purposes of the present invention the source is preferably located at the end of the fiber rather than spaced from it, but the latter is also possible. The exact value of $\alpha$ is twice the arctan of the ratio of the radius of the fiber to its length, or very close to the ratio of the diameter to the length (in radians) for ratios of interest in this application. It is readily seen that a ratio of 1/1000 restricts $\alpha$ to a milliradian or conversely to see the illumination source the fiber must be aligned within one milliradian of a line from the users eye pupil to the radiation source.

Figure 2:
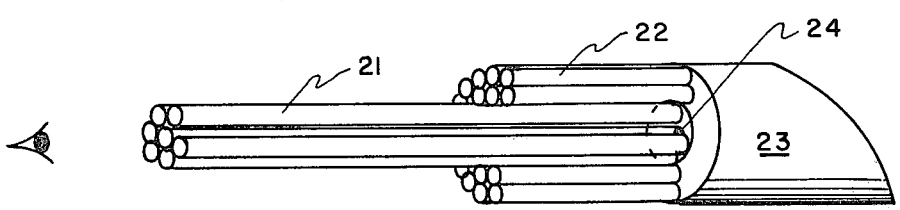
FIG. 2 shows a complete aiming device with hollow micro-channel fibers and illuminator means.

FIG. 2 shows a simple arrangement of the light collimating fibers of FIG. 1 to form an aiming device. Again the size of the fibers are greatly exaggerated for clarity. A central bundle of long fibers 21 is surrounded by a second bundle of shorter fibers. The ends of both bundles are abutted to a light source 23. The inner bundle may have a diameter of approximately one sixteenth of an inch and the outer bundle an outer diameter of approximately an eighth inch. The outer bundle can be initially solid and bored to accept the inner bundle. The fibers are of the order of one mil in diameter or less so that the center bundle may contain upwards of a thousand fibers or more. The required length of the center fibers to provide an accuracy of one milliradian is thus only an inch or so. The large number of fibers present increases the available light thus giving a more positive indication of a boresighted condition. The shorter fibers provide a less sensitive angular indication of the same condition during the aiming process. The difference in the fiber lengths can be an order of magnitude with a corresponding difference in the value of $\alpha$ from FIG. 1. The ends of some of the fibers, including at least the center fiber, are covered with a phosphor light source that glows at night. This phosphor preferably contains a radioactive energizing agent although phosphors that store ambient light energy can be used for some applications.

Figure 3:
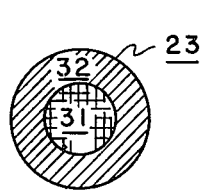
FIG. 3 shows an end view of the Day-Glo illuminator of FIG. 2.
Figure 4:
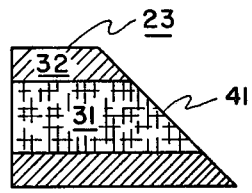
FIG. 4 shows a side view of FIG. 3.

FIG. 3 shows the end view of the daytime portion of the light source 23. A short rod 31 of Day-Glo plastic of one color is inserted into a larger diameter rod 32 of the same plastic of a different color which has been axially bored to receive it. The diameters of the two rods correspond to the outer diameters of the two bundles of fibers in FIG. 2. As shown in FIG. 4, the ends of the rods not abutting the fibers are cut at a 45° angle to provide a large face 41 which receives a maximum of skylight without unduly lengthening the structure axially. The phosphor is preferably applied to fiber contacting end of these rods.

Figure 5:
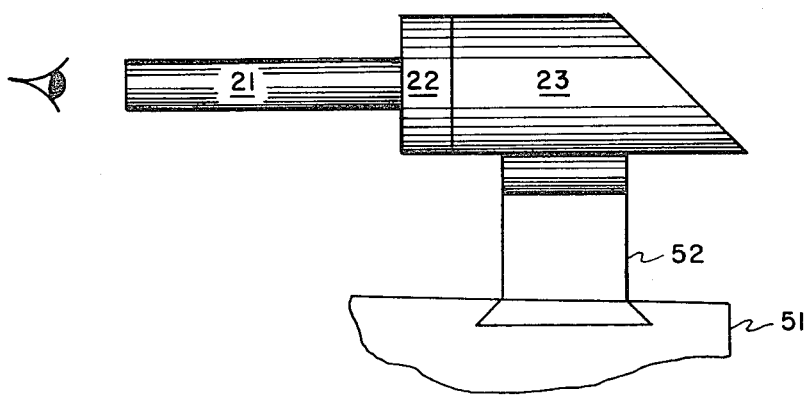
FIG. 5 shows the aiming device of FIG. 2 mounted on a rifle barrel.

FIG. 5 shows a simple combination of the aiming device with a rifle. After the rifle is held boresighted on a target in a suitable vise, the aiming device is attached to the rifle barrel 51 at the forward sight 52 by means of an epoxy or similar cement. The user then positions his eye until the device is seen centered on the target. Holding this position he adjusts the angular position of the device in the tacky cement until first the end of the outer bundle is illuminated and subsequently the ends of both bundles. The cement is then allowed to dry with the device in this position. Those skilled in the art will readily recognize that screw adjustments for range and windage may be provided and that these may be used to adjust the device even after the epoxy or other mechanical attachment has been effected. In the latter situation, the range and windage scales are added after the adjustment, or means is provided to reset them to zero.

To use the finished assembly, one merely adjusts the range and windage, lines up the aiming device on the target and angularly orients the device until the center fibers are illuminated, the outer fibers giving the user a gross indication during the latter function.

The light collimating fibers must, of course, be straight, uniform and of good optical quality to give the best results. Such fibers are readily available commercially in a range of sizes well suited for the present invention. Hollow fibers are preferred due to their simplicity and low transmission losses. Day-Glo types plastics are commercially available in a variety of colors which provide good contrast such as red and green, for the example shown. In general, the diameter of the device will depend on the spacing between it and the eye of the user, the two being directly related to permit comfortable viewing without unduly obscuring the target and its surroundings.

Instead of two bundles of different lengths any number of bundles in steadily decreasing graduation can be used to indicate various angular deviations (non-illuminated conditions) from the boresight condition. There are constraints, however, that make highly numerous bundles undesirable. The first, of course, is the difficulty of manufacture and resulting high cost. In addition, there is the optical confusion that can result. Each bundle must be large enough to be readily distinguished, but as previously mentioned the overall size cannot be too large either. The use of a phosphor such as element 24 in FIG. 2 makes the device ideal for use at night with devices such as night goggles and starlight scopes. In the latter, it would eliminate the need for the rather expensive and troublesome illuminated reticles now employed and the need for accurately mounting these systems. By covering only a few fibers in each bundle the daylight function is not compromised. Transparent phosphors are also available for this purpose.

Many variations of the above structures will, of course, be readily apparent to those skilled in the art, but the invention is limited only as defined in the claims which follow.

I claim:

1. An aiming device comprising:
   at least two bundles of straight parallel light collimating fibers having normal ends with diameters which are orders of magnitude less than their lengths, the fibers in each bundle being equal in length and the fibers in each bundle having a length to diameter ratio different from the fibers in every other bundle; and
   an illumination means attached to said bundles to illuminate one end of the fibers in each bundle with light of one color, the colors for adjacent bundles being different.
2. The device according to claim 1 wherein:
   said fibers consist of hollow micro-channel tubes of light absorbing material.
3. The device according to claim 1 wherein:
   said one end of each fiber is aligned in a common plane and said illumination means is attached to said one end.
4. The device according to claim 1 wherein:
   the fibers in each bundle fill mutually exclusive cylindrically bounded zones about a common axis parallel thereto.
5. The device according to claim 1 wherein:
   said illumination source includes a plurality of sections of Day-Glo plastic, each section having a characteristic color and a shape to match the configuration of the fiber ends in one of said bundles.
6. The device according to claim 1 wherein:
   said illumination source includes a phosphor coating that glows at night covering only a portion of the fiber ends in at least one bundle.
7. The device according to claim 1 wherein:
   the longest of said fibers has a length to diameter ratio of at least 2000.

* * * * *